US010667147B2

(12) United States Patent
Wen et al.

(10) Patent No.: US 10,667,147 B2
(45) Date of Patent: May 26, 2020

(54) SENSING RECOGNITION METHOD AND DEVICE BASED ON WIRELESS COMMUNICATION SIGNALS (71) Applicant: Beijing University of Posts & Telecommunications, Beijing (CN)

(72) Inventors: Xiangming Wen, Beijing (CN); Lingchao Guo, Beijing (CN); Zhaoming Lu, Beijing (CN); Tao Lei, Beijing (CN); Gang Cao, Beijing (CN); Zhihong He, Beijing (CN)

(73) Assignee: Beijing University of Posts & Telecommunications, Beijing (CN)

( * ) Notice: Subject to any disclaimer, the term of this patent is extended or adjusted under 35 U.S.C. 154(b) by 23 days.

(21) Appl. No.: 15/847,961

(22) Filed: Dec. 20, 2017

(65) Prior Publication Data
US 2019/0174330 A1 Jun. 6, 2019

(30) Foreign Application Priority Data
Dec. 6, 2017 (CN) .......................... 2017 1 1277751

(51) Int. Cl.
| H04L 12/00 | (2006.01) |
| H04W 24/02 | (2009.01) |
| H04B 17/318 | (2015.01) |
| H04B 17/21 | (2015.01) |
| H04B 17/309 | (2015.01) |
| H04W 24/08 | (2009.01) |
| H04W 84/12 | (2009.01) |

(52) U.S. Cl.
CPC ............ *H04W 24/02* (2013.01); *H04B 17/21* (2015.01); *H04B 17/309* (2015.01); *H04B 17/318* (2015.01); *H04W 24/08* (2013.01); *H04W 84/12* (2013.01)

(58) Field of Classification Search
None
See application file for complete search history.

(56) References Cited

U.S. PATENT DOCUMENTS

| 2011/0302411 A1* | 12/2011 | Liang ................... H04L 63/0823 713/158 |
| 2019/0020530 A1* | 1/2019 | Au ...................... H04W 72/0413 |
| 2019/0094350 A1* | 3/2019 | Baheti ...................... G01S 13/04 |
| 2019/0097865 A1* | 3/2019 | Xu ........................... H04L 25/00 |

* cited by examiner

*Primary Examiner* — Noel R Beharry
*Assistant Examiner* — Lionel Preval
(74) *Attorney, Agent, or Firm* — Luoh J. Wu; Continent Patent Office LLP (57) ABSTRACT A sensing recognition method and device based on wireless communication signals are disclosed. The method comprises the steps of obtaining channel state information from a received wireless communication signal; extracting a channel state feature value from the channel state information; and outputting a sensing result mapped with the channel state feature value according to the channel state feature value. The disclosed method and device can improve the accuracy of sensing recognition and achieve better recognition effect.

15 Claims, 5 Drawing Sheets

SENSING RECOGNITION METHOD AND DEVICE BASED ON WIRELESS COMMUNICATION SIGNALS

CROSS-REFERENCE TO RELATED APPLICATIONS

This disclosure claims the priority of Chinese patent application No. 2017112777518, filed on Dec. 6, 2017, and the entire contents thereof are incorporated herein by reference.

TECHNICAL FIELD

The present disclosure relates to communications and computer technologies, and in particular, to a sensing recognition method and device based on wireless communication signals.

BACKGROUND

Human-computer interaction and intelligent recognition are currently hot research topics. The human-computer interaction refers to communication with computer through gestures, motions, language, etc., which can be used in smart home, motion sensing games, lip recognition, vital signs measurement and so on. The intelligent recognition refers to identify the changes in the position of objects in space by using computers, which can be applied to security systems, equipment monitoring and so on.

Human-computer interaction and intelligent recognition technology all involve the use of sensing technology. At present, there are two types of sensing technologies based on sensors and based on vision. As for the sensing technology based on sensors, the sensors frequently used include acceleration sensors, gyroscopes, barometric sensors, radio frequency identification (RFID). The disadvantage of this approach is that the user is required to wear the sensor device with low accuracy. As for the sensing technology based on the vision, it is necessary to achieve the sensing by using camera to capture images or video data and using image processing and computer vision methods. The disadvantage of this approach is light sensitivity, and may reveal privacy.

Recently, the sensing technology based on WiFi devices is becoming a new research direction. Although the related research mentioned that it is possible to achieve sensing recognition by considering RSSI (Received Signal Strength Indication), such recognition has low accuracy and poor recognition effect.

SUMMARY OF DISCLOSURE

In view of this, the objective of the present disclosure is to provide a method and apparatus of sensing recognition based on wireless communication signals, which can improve the accuracy of sensing recognition and achieve better recognition effects.

According to one aspect of the present disclosure, there is provided a sensing recognition method based on wireless communication signals, comprising the steps of:
obtaining channel state information from a received wireless communication signal;
extracting a channel state feature value from the channel state information; and
outputting a sensing result mapped with the channel state feature value according to the channel state feature value.

Preferably, the wireless communication signal includes a WiFi signal or a WAPI signal transmitted by a wireless router.

Preferably, the channel state feature value comprises an amplitude feature value and a phase feature value.

Preferably, before the step of extracting a channel state feature value from the channel state information, the method further comprises the step of:
performing a signal pre-processing on amplitude and phase of the channel state information.

Preferably, the step of performing a signal pre-processing on amplitude and phase of the channel state information comprises the steps of:
performing a phase calibration on the channel state information by a linear transformation method; and
performing a filtering and amplitude-modulation on the channel state information by a Hampel filter and a moving average filter.

Preferably, before the step of performing a phase calibration on the channel state information by a linear transformation method, the method further comprises the step of:
performing a noise-elimination processing on the channel state information by a low-pass filter.

Preferably, the step of outputting a sensing result mapped with the channel state feature value according to the channel state feature value comprises the steps of:
inputting the channel state feature value into a preset classifier to obtain a classification label mapped with the channel state feature value; and
outputting a sensing result according to the classification label.

According to another aspect of the present disclosure, there is provided a sensing recognition device based on wireless communication signals, comprising:
an information obtaining module, configured to obtain channel state information from the received wireless communication signal;
a feature extracting module, configured to extract a channel state feature value from the channel state information obtained by the information obtaining module; and
a sensing outputting module, configured to output a sensing result mapped with the channel state feature value according to the channel state feature value extracted by the feature extracting module.

Preferably, the sensing recognition device further comprises:
a signal pre-processing module, configured to perform a signal pre-processing on amplitude and phase of the channel state information obtained by the information obtaining module;
a feature extracting module, configured to extract a channel state feature value from the channel state information after the signal pre-processing.

Preferably, the sensing outputting module comprises:
a classifying sub-module, configured to input the extracted channel state feature value into a preset classifier to obtain a classification label mapped with the channel state feature value; and
an outputting sub-module, configured to output a sensing result according to the classification label obtained by the classifying sub-module.

It can be found that the technical solution of the embodiments of the present disclosure is to selectively obtain channel state information from a received wireless communication signal, extract a channel state feature value from the channel state information, and output a sensing result mapped with the channel state feature value according to the channel state feature. The channel state information (CSI), as a physical parameter, can better reflect the motion features of human or object, in particular, it can reflect the motion of human or object occurring in the physical space between the transmitter and the receiver of the wireless communication signals, so that in the present disclosure, the channel state feature value extracted from the channel state information is used to output the corresponding mapped sensing result. When the channel state feature value is different, different sensing results are output, so that the motion of human or object can be sensed by sensing the change of the channel state feature value, which cannot only improve the accuracy of sensing recognition, but also can achieve better recognition results, and is more beneficial to human-computer interaction or intelligent recognition.

Further, the wireless communication signal can be a WiFi signal or a WAPI signal transmitted by a wireless router, or other wireless communication signals.

Further, in the present disclosure, the amplitude and phase of the received channel state information can be subjected to a signal pre-processing, so as to filter out some irrelevant measurement noise and other interference caused by some human activities, to reduce various noise interference, and further improve the accuracy of sensing recognition.

Further, in the present disclosure, the channel state feature value can be input into a preset classifier to obtain a classification label mapped with the channel state feature value, and then a sensing result is output according to the classification label, so that a corresponding model of the channel state feature value and the classification label can be established. When there is a new channel state feature value is input, a corresponding classification can be created, which can adapt to more application scenarios.

BRIEF DESCRIPTION OF DRAWINGS

The above and other objects, features and advantages of the present disclosure will become more apparent by describing the exemplary embodiments of the present disclosure in detail with reference to the accompanying drawings, in which the same reference numeral generally denotes the same part.

DETAILED DESCRIPTION

In order that the objects, technical solutions and advantages of the present disclosure will become more apparent, the disclosure will be further described in detail below in connection with specific embodiments and with reference to the drawings. Although the drawings illustrate the preferred embodiments of the present disclosure, it should be understood that the disclosure may be implemented in various forms and should not be limited to the embodiments.

The present disclosure provides a sensing recognition method based on wireless communication signals, which can improve the accuracy of sensing recognition and achieve better recognition effect. The embodiments of the present disclosure are described in detail with reference to the accompanying drawings.

Figure 1:
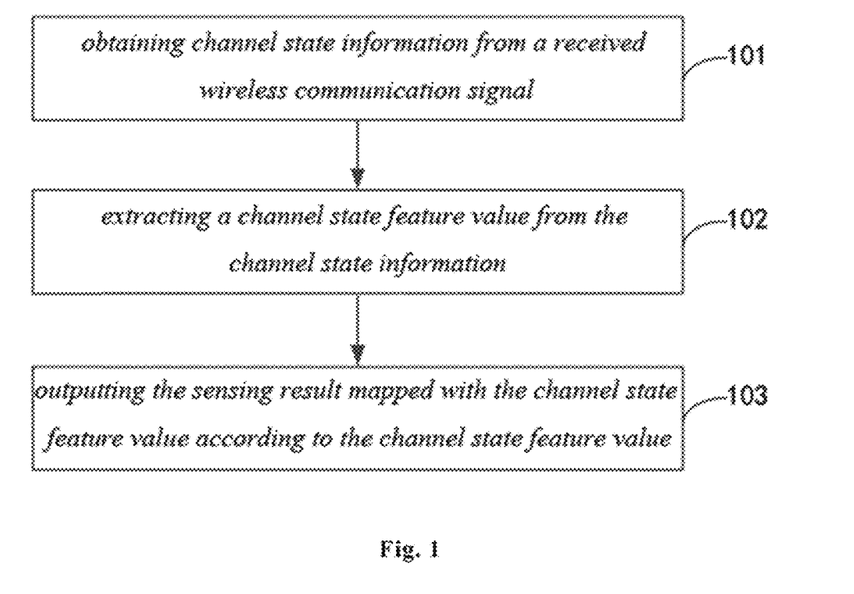
FIG. 1 is a schematic flowchart of a sensing recognition method based on wireless communication signals according to an embodiment of the present disclosure.

FIG. 1 is a schematic flowchart of a sensing recognition method based on wireless communication signals according to an embodiment of the present disclosure. The method can be applied to a sensing recognition device, and the sensing recognition device can be located in a signal receiver.

Referring to FIG. 1, in step 101, channel state information is acquired from a received wireless communication signal. In this step, the signal receiver receives the wireless communication signal transmitted by the signal transmitter, and obtains the channel state information from the received wireless communication signal. The wireless communication signal can be a WiFi signal transmitted by a wireless router, a WAPI (Wireless LAN Authentication and Privacy Infrastructure) signal, or other wireless communication signals, such as a cellular network signal or the like. The wireless router can be an ordinary router or a commercial router.

In step 102, a channel state feature value is extracted from the channel state information. The channel state feature value can comprise an amplitude feature value and a phase feature value.

In step 103, a sensing result mapped with the channel state feature value is output according to the channel state feature value. The step can comprises the steps of inputting the channel state feature value into a preset classifier to obtain a classification label mapped with the channel state feature value, and outputting a sensing result according to the classification label.

It can be found that the technical solution of the embodiments of the present disclosure is to selectively obtain channel state information from a received wireless communication signal, extract a channel state feature value from the channel state information, and output a sensing result mapped with the channel state feature value according to the channel state feature. The channel state information (CSI), as a physical parameter, can better reflect the motion features of human or object, in particular, it can reflect the motion of human or object occurring in the physical space between the transmitter and the receiver of the wireless communication signals, so that in the present disclosure, the channel state feature value extracted from the channel state information is used to output the corresponding mapped sensing result.

When the channel state feature value is different, different sensing results are output, so that the motion of human or object can be sensed by sensing the change of the channel state feature value, which cannot only improve the accuracy of sensing recognition, but also can achieve better recognition results, and is more beneficial to human-computer interaction or intelligent recognition.

Figure 2:
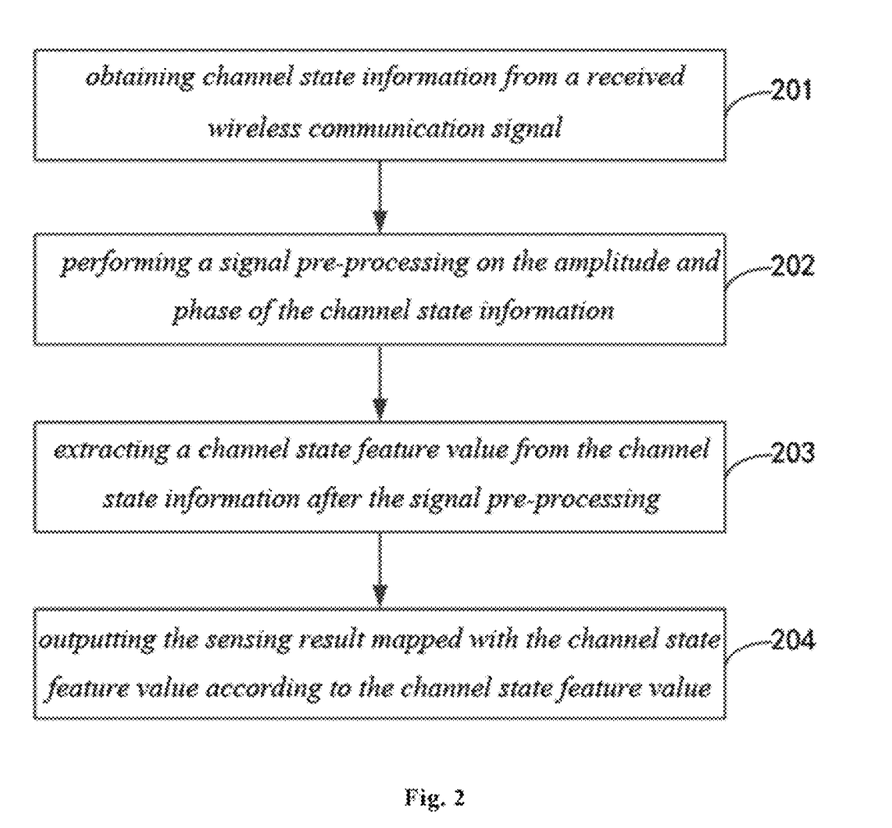
FIG. 2 is another schematic flowchart of a sensing recognition method based on wireless communication signals according to another embodiment of the present disclosure.

FIG. 2 is another schematic flowchart of a sensing recognition method based on wireless communication signals according to another embodiment of the present disclosure. The method can be applied to a sensing recognition device, and the sensing recognition device can be located at a signal receiver.

Referring to FIG. 2, in step 201, channel state information is acquired from a received wireless communication signal, and it can refer to the description of step 101.

In step 202, the signal pre-processing is performed on the amplitude and the phase of the channel state information. The signal preprocessing in this step can comprises the steps of performing a phase calibration on the channel state information by a linear transformation method; and filtering and amplitude-modulating the channel state information by a Hampel filter and a moving average filter. Before performing the phase calibration on the channel state information by a linear transformation method, the method can further comprises the steps of performing a noise-elimination processing on the channel state information by using a low-pass filter.

In step 203, a channel state feature value is extracted from the channel state information after the signal preprocessing. The amplitude feature value and the phase feature value can be extracted from the channel state information after the signal pre-processing.

In step 204, a sensing result mapped with the channel state feature value is output according to the channel state feature value. The step can comprises the steps of inputting the channel state feature value into a preset classifier to obtain a classification label mapped with the channel state feature value, and outputting a sensing result according to the classification label.

It can be found that in the technical solutions of the embodiments of the present disclosure, the signal pre-processing can be further performed on the amplitude and the phase of the received channel state information, so as to reduce irrelevant measurement noise and other interference caused by some human activity, thereby reducing all kinds of noise interference, to further improve the accuracy of sensing recognition.

Figure 3:
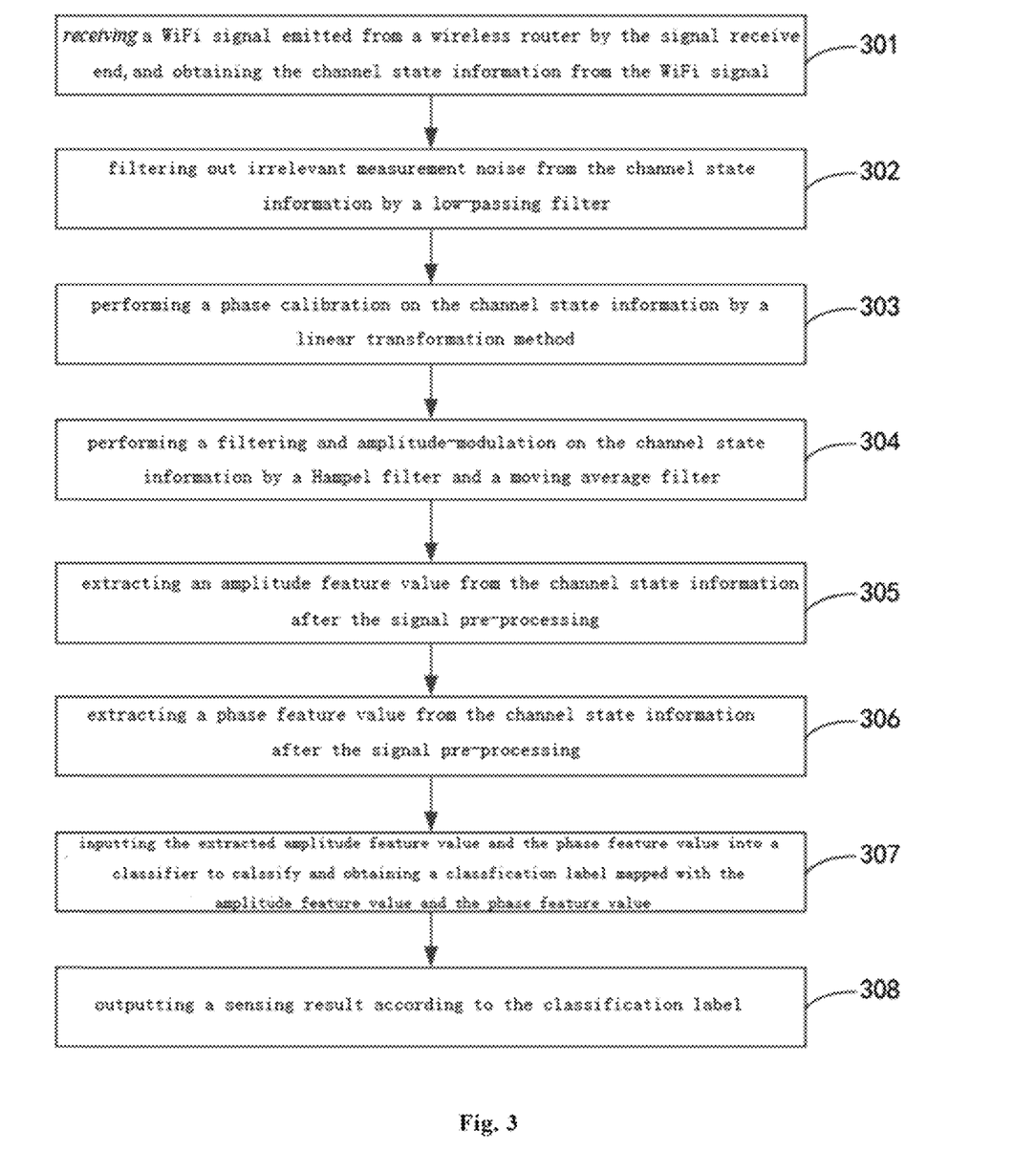
FIG. 3 is another schematic flowchart of a sensing recognition method based on wireless communication signals according to another embodiment of the present disclosure.

FIG. 3 is another schematic flowchart of a sensing recognition method based on wireless communication signals according to another embodiment of the present disclosure. FIG. 3 describes an embodiment in more detail with respect to FIGS. 1 and 2. The method can be applied to a sensing recognition device, and the sensing recognition device can be located at a signal receiver.

The embodiment mainly acquires channel state information between the WiFi device such as a wireless router and an access point, and then filters out various types of noise interference such as electronic noise and other human activity noise in the channel state information, and finally extracts the features reflecting the motion of human or object in the channel state information, and uses a classification method to sense the motion of human or object occurring in the physical space between the WiFi device and its access point, so as to realize the sensing recognition.

In this embodiment, the signal receiver is exemplified by, but not limited to, a computer device having a wireless network card, the signal transmitter is exemplified by, but not limited to, a wireless router, and the wireless signal is exemplified by, but not limited to, a WiFi signal transmitted by the wireless router.

Referring to FIG. 3, in step 301, a signal receiver receives a WiFi signal transmitted by a wireless router, and obtains channel state information from the WiFi signal. In this step, a wireless router can be used as a signal transmitter to transmit WiFi signals. A computer device having a wireless network card serves as a signal receiver. The signal receiver establishes a connection with the wireless router via the wireless network card, and receives a WiFi signal, and collects, obtains and stores the original channel state information of the WiFi signal, for example stored by recording in the text in binary form. The wireless router can be a commercial wireless router or a common router.

Figure 4:
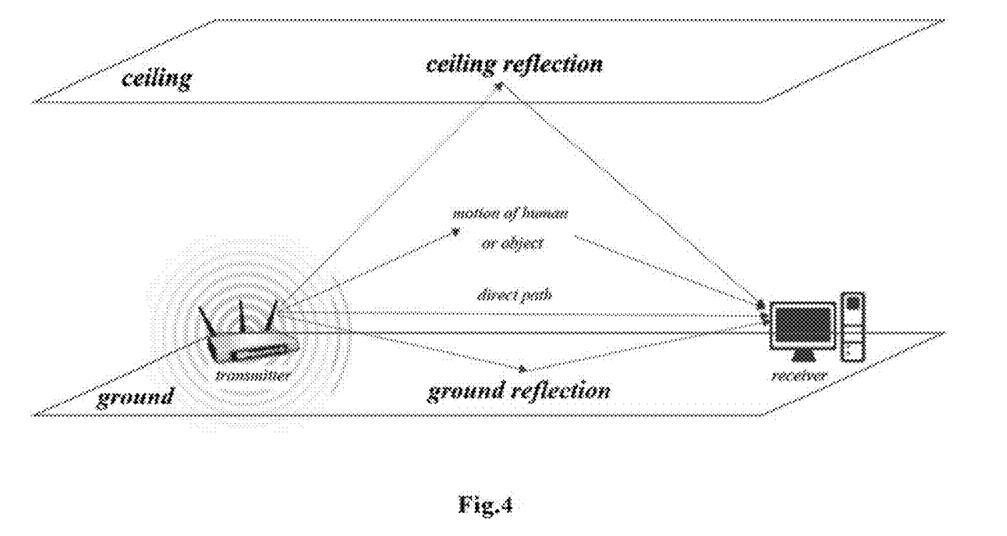
FIG. 4 is a schematic view of an application scenario in a sensing recognition method based on wireless communication signals according to an embodiment of the present disclosure.

Referring to FIG. 4, it is a schematic diagram of an application scenario in a sensing recognition method based on a wireless communication signals according to an embodiment of the present disclosure. In FIG. 4, the wireless router transmits the WiFi signals as the signal transmitter and the computer device receives the WiFi signals as the signal receiver. The WiFi signals can be affected by ground reflection, ceiling reflection, motion of human or object during transmission. In other words, the motion of human or object occurs between the signal receiver and the signal transmitter can affect the propagation path of the wireless communication signal. The signal receiver can achieve the sensing of the motion of human or object by collecting and processing the channel state information during transmission.

After the wireless network card establishes a connection with the wireless router, the wireless router can ping the wireless router address. In this case, the wireless router can send a data packet to the signal receiver, and the signal receiver can obtain the channel state information from the received data packet through the CSI Tool (channel state information tool).

The data packet received by the signal receiver contains a variety of data content, of which CSI (Channel State Information) is one of the important contents. CSI is the physical layer information defined on the sub-carrier scale and can reflect the channel attributes of a communication link, that is, how the signal arrives at the receiver from the transmitter, which can reflect the multipath effect or the frequency selective fading in the communication link.

By using a wireless network card supporting the IEEE 802.11n protocol, a set of channel state information can be obtained from each received data packet, which can be expressed as: $H(k)=\|H(k)\|e^{1\angle H(k)}$, where $H(k)$ represents the CSI of the $k^{th}$ OFDM (Orthogonal frequency division multiplexing subcarrier) sub-carrier, $\|H(k)\|$ and $\angle H(k)$ are the amplitude and the phase of the sub-carrier respectively. Each group of CSI data has k discretely sampled data that responds to the channel frequency in the WiFi band by taking the frequency difference between adjacent subcarriers as the frequency sampling interval.

The CSI is a three-dimensional matrix of size Ntx×Nrx× 30, where Ntx represents the number of transmitted space-time data streams. Nrx represents the number of receiving antennas, 30 represents the number of sub-carriers in OFDM channel.

In step 302, the irrelevant measurement noise is filtered out of the channel state information by a low-pass filter. In this embodiment, a signal pre-processing can be further performed after obtaining the channel state information. The irrelevant measurement noise can be filtered out of the channel state information by a low-pass filter firstly, that is, the noise-elimination processing can be performed. The irrelevant measurement noise has a higher frequency than the motion of human or object, so that the low-pass filter can be used to filter out the irrelevant measurement noise. The cut-off frequency of the low-pass filter can be set to the reciprocal of the tenth of the number of samples per second.

In step 303, a phase calibration can be performed on the channel state information by a linear transformation method. In this step, a signal pre-processing is further performed on the channel state information.

In this step, the random phase offset can be removed from the channel state information by a linear transformation method. The formula of linear transformation method is:

phase estimate of the $k^{th}$ sub-carrier=phase measurement of the $k^{th}$ sub-carrier−phase slope of entire band×serial number of sub-carrier−phase intercept of entire band The phase value after the phase offset is removed can be obtained by this formula.

The phase measurement value of the $k^{th}$ sub-carrier can be obtained in the channel state information obtained in step 301. The phase slope of entire band is: (phase measurement value of the $30^{th}$ sub-carrier−phase measurement value of the $1^{st}$ sub-carrier)/(the serial number of the 30th sub-carrier−the serial number of the $1^{st}$ sub-carrier). The phase intercept of entire band is: (sum of the phase measurement value of 30 sub-carriers)/30.

In step 304, a filter and amplitude modulation processing is performed on the channel state information by a Hampel filter and a moving average filter. In this step, a signal pre-processing is further performed on the channel state information. In this step, the interference of other human activities can be filtered out by means of a Hampel filter and a moving average filter. Such interference can be such that irrelevant people or objects move around or between the signal receiver and the signal transmitter, or blocks between the signal receiver and the signal transmitter in a short time.

The Hampel filter can be used for both amplitude and phase, and the moving average filter can be used for amplitude. First, the Hampel filter can be used to deal with the amplitude and the phase difference between the two antennas, respectively, and the phase processing is finished. Then the amplitude can be processed again by a moving average filter.

The interference can be further eliminated by the amplitude modulation processing of the moving average filter to further smooth the amplitude.

The window value $w_1$ of the moving average filter value can be valued based on experiments, for example, if $w_1$ is too larger, then the delay will be too larger, and if $w_1$ is too smaller, then the filtering effect will be unachieved. The size of delay and the filtering effect can be seen through the filtering result plot drawn by the experiments, so that it is more appropriate for the window value $w_1$ of about 50.

The Hampel filter can be applied to process the amplitude feature and the phase difference between the two antennas. Because the fluctuation on the amplitude and the phase difference between two antennas of the channel state information due to the movement or standing of people is relatively larger than other motions, the Hampel filter can be used to find the outliers within the window and replace them with the mean, which can filter out certain human activities interference. The size of window value $w_2$ of the Hampel filter can be determined by the duration of each sampling, and $w_2$ is equaled to the number of samples collected at a time, and it can be replaced by an average over the outliners.

The number of samples refers to the number of data packets received by the signal receiver within the duration of an motion.

In step 305, an amplitude feature value is extracted from the channel state information after the signal pre-processing. In this step, the feature value is extracted from the amplitude of the channel state information after the signal pre-processing, that is, the amplitude feature value is extracted, in which the Mean, Standard Deviation (STD), Mean Absolute Deviation (MAD), Max, etc. of the 30 sub-carriers in each data packet can be calculated as the amplitude feature values at this moment. The Mean, STD, MAD and Max can be calculated by using the relevant existing formula.

It should be noted that the amplitude feature value cannot be limited to the above four values, but may also be other values. Generally, the appropriate feature values can be selected by the feature value distribution drawn by experiments or by using the depth learning method. The deep learning method is generally to design a neural network, and take the output of the neural network as the feature value.

The feature value extraction method generally differs with the recognition target and the classification algorithm. At present, there are mainly three methods for extracting signal feature data: time domain analysis, frequency domain analysis and time-frequency domain analysis. Time-domain analysis refers to analyzing the statistical features of data from the perspective of time-domain, which is usually inseparable with the probabilistic method. The commonly used time-domain features include: Mean, Variance, Standard Deviation (STD), Mean Absolute Deviation (MAD), Signal Period, Peak-to-peak Value (PTP), Correlation (Cor), Energy, Integration, Mean Skewness, Interquartile Range (IR) and so on. Frequency domain analysis refers to analyzing the data features from the perspective of frequency domain, and the commonly used frequency-domain features includes: Fast Fourier Transform Coefficients, Energy Spectral Density, Entropy and so on. The computational scale of frequency domain analysis is much larger than that of the time domain analysis. Time-frequency domain analysis is the combination of the both, that is, analysis from the perspective of combination of time domain with frequency domain, such as Wavelet Transform method.

In step 306, the phase feature values is extracted from the channel state information after signal pre-processing. In this step, the feature value is extracted from the phase of the channel state information after the signal pre-processing, that is, the phase feature value is extracted, in which the difference between the true phase estimation values of the two receiving antennas of the same sub-carrier can be calculated as the phase feature value. It should be noted that there is no necessary sequence relationship between step 305 and step 306.

In step 307, the extracted amplitude feature value and the phase feature value are input into a classifier to classify and obtain the classification labels mapped with the amplitude feature value and the phase feature value. In the present disclosure, the corresponding classification label can be set for the channel feature value in advance, and the mapping relationship between the channel feature value and the corresponding classification label can be established. Then as long as inputting the channel feature value, the classification label corresponding to the mapping relationship can be output by the classifier.

The classification can be related to the specific application scenarios. For example, the object monitoring only needs to determine whether the object are moving or not, that is, two types of classification; and human gesture recognition can set multiple gestures according to different scenarios, that is, multiple types of classification. Generally, for the classifier having a trained model, the classification can be achieved by inputting the feature value.

The classifier is a kind of algorithm of machine learning or depth learning. Different classifiers have different principles. Corresponding models of between the feature value and the label can be established through training. When a new feature value is input, classification can be made accordingly to obtain the corresponding classification label. For example, two actions can be set, one action for jump and the other action for crouch. The two actions have different effects on the channel state information, so that the extracted amplitude and phase feature values are also different. For example, the classification label of jump action can be set to 1, and the classification label of crouch action can be set to 2. The model can be established by a lot of repetition of the two actions, extraction of the feature values, and adding the corresponding labels. In the subsequent application, if the related actions are detected and their feature values are calculated and input into the classifier, then the classifier will output the mapped classification labels.

In step 308, a sensing result is output according to the classification label. In this step, the classification label can be converted into a human-readable output result or a control instruction for a certain device, that is, a sensing result is output.

It can be found that the embodiment can provide a fine-grained, easy-to-deploy and low-cost sensing recognition method by using a WiFi device such as a wireless router. The method takes channel state information as a physical parameter and senses the change of the channel state information to sense the motion of human or object, in order to achieve sensing recognition, which can be applied to human-computer interaction or intelligent recognition scenario.

A sensing recognition device based on wireless communication signals corresponding to the present disclosure are described below.

Figure 5:
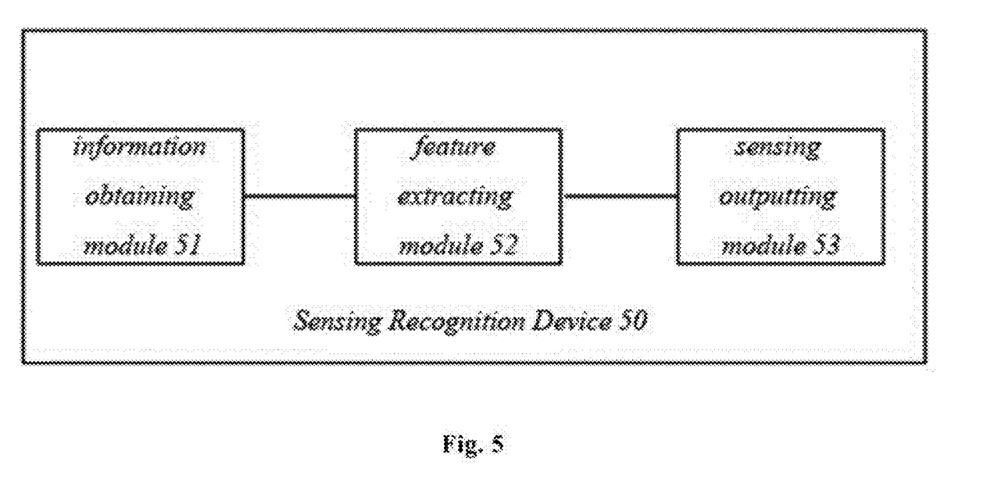
FIG. 5 is a schematic block diagram of a sensing recognition device based on wireless communication signals according to an embodiment of the present disclosure.

FIG. 5 is a schematic block diagram of a sensing recognition device based on wireless communication signals according to an embodiment of the present disclosure. Referring to FIG. 5, the sensing recognition device 50 comprises an information obtaining module 51, a feature extracting module 52, and a sensing outputting module 53.

The information obtaining module 51 is configured to obtain channel state information from a received wireless communication signal. The wireless communication signal can be a WiFi signal transmitted by a wireless router or a WAPI signal or other types of wireless communication signal such as a cellular network signal. The feature extracting module 52 is configured to extract the channel state feature value from the channel state information obtained by the information obtaining module 51. The channel state feature value can include an amplitude feature value and a phase feature value. The sensing outputting module 53 is configured to output a sensing result mapped with the channel state feature value according to the channel state feature value extracted by the feature extracting module 52. The sensing outputting module 53 can input the channel state feature value into a preset classifier to obtain a classification label mapped with the channel state feature value, and output a sensing result according to the classification label.

Figure 6:
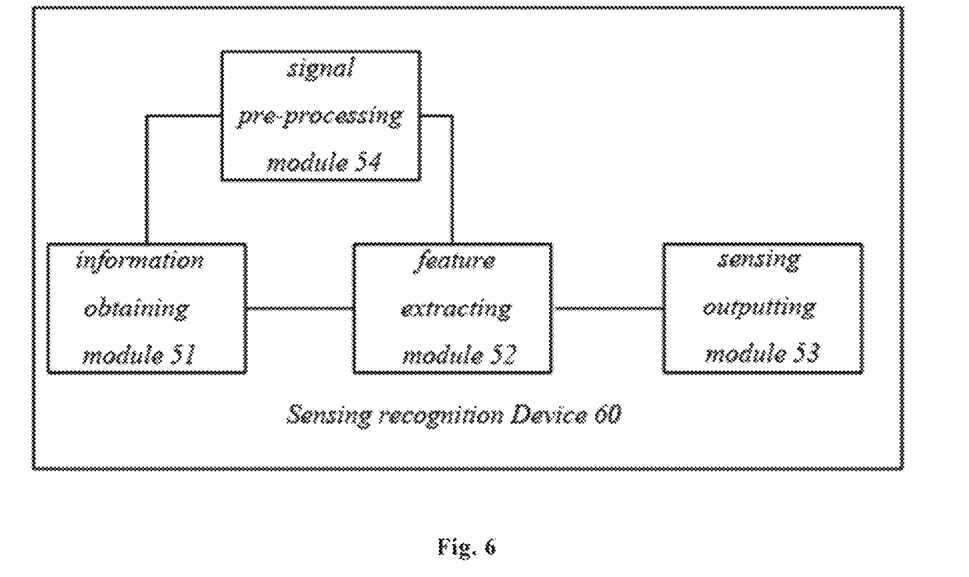
FIG. 6 is another schematic block diagram of a sensing recognition device based on wireless communication signals according to another embodiment of the present disclosure.

FIG. 6 is another schematic block diagram of a sensing recognition device based on wireless communication signals according to another embodiment of the present disclosure.

Referring to FIG. 6, the sensing recognition device 60 includes an information obtaining module 51, a feature extracting module 52, a sensing outputting module 53, and a signal pre-processing module 54.

The information obtaining module 51 is configured to obtain the channel state information from the received wireless communication signal.

The signal pre-processing module 54 is configured to perform a signal pre-processing on the amplitude and the phase of the channel state information obtained by the information obtaining module 51. The signal pre-processing can comprises the steps of performing a phase calibration on the channel state information by a linear transformation method; and filtering and amplitude modulating on the channel state information by using a Hampel filter and a moving average filter. Before performing the phase calibration on the channel state information by a linear transformation method, it can further comprises the step of performing a noise-elimination processing on the channel state information by using a low-pass filter.

The feature extracting module 52 is configured to extract the channel state feature value from the channel state information after the signal pre-processing module 54.

The sensing output module 53 is configured to output the sensing result mapped with the channel state feature value according to the channel state feature value extracted by the feature extracting module 52.

Figure 7:
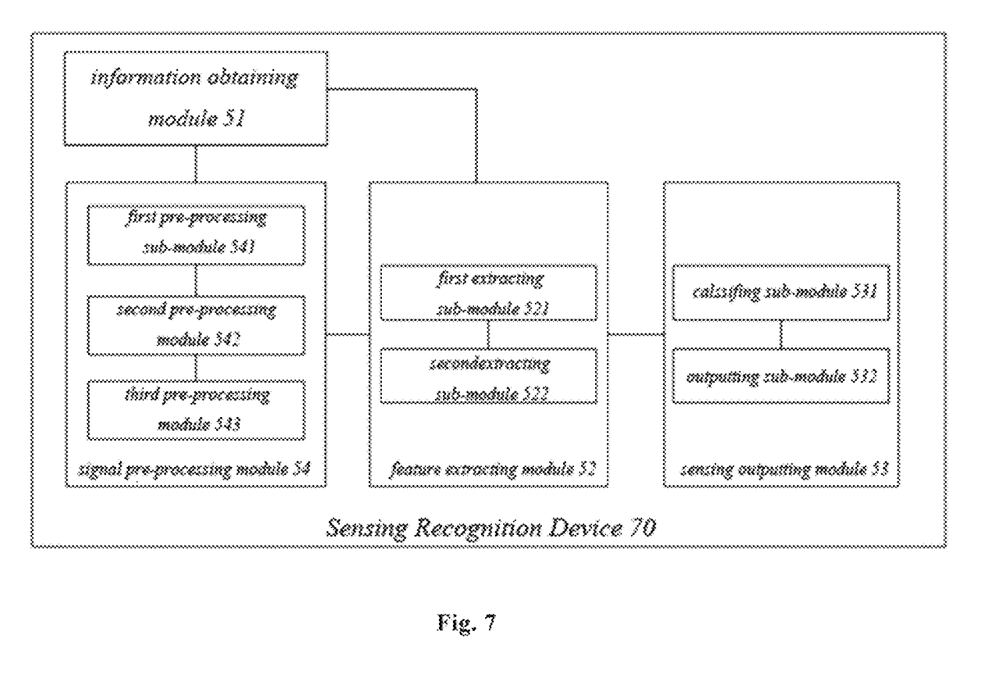
FIG. 7 is another schematic block diagram of a sensing recognition device based on wireless communication signals according to another embodiment of the present disclosure.

FIG. 7 is another schematic block diagram of a sensing recognition device based on wireless communication signals according to another embodiment of the present disclosure. FIG. 7 describes the device structure in more detail with respect to FIGS. 5 and 6. Referring to FIG. 7, the sensing recognition device 70 comprises an information obtaining module 51, a feature extracting module 52, a sensing outputting module 53, and a signal pre-processing module 54.

The functions of the information obtaining module 51, the feature extracting module 52, the sensing output module 53 and the signal pre-processing module 54 can be referred to the description of FIG. 5 or FIG. 6.

The sensing output module 53 can further comprises a classifying sub-module 531 and an outputting sub-module 532. The classifying sub-module 531 is configured to input the extracted channel state feature value into a preset classifier to obtain a classification label mapped with the channel state feature value. The outputting sub-module 532 is configured to output the sensing result according to the classification label obtained by the classification sub-module 531.

The signal pre-processing module 54 can further comprise a first pre-processing sub-module 541, a second pre-processing sub-module 542, and a third pre-processing sub-module 543. The first pre-processing sub-module 541 is configured to perform a noise-elimination processing on the channel state information by using a low-pass filter. The second pre-processing sub-module 542 is configured to perform a phase calibration on the channel state information by a linear transformation method. The third pre-processing sub-module 543 is configured to filter and amplitude modulate the channel state information by using a Hampel filter and a moving average filter.

The feature extracting module 52 can further comprise a first extracting sub-module 521 and a second extracting sub-module 522. The first extraction sub-module 521 is configured to extract the amplitude feature value of the channel state information from the obtained channel state information. The second extracting sub-module 522 is configured to extract the phase feature value of the channel state information from the obtained channel state information.

Figure 8:
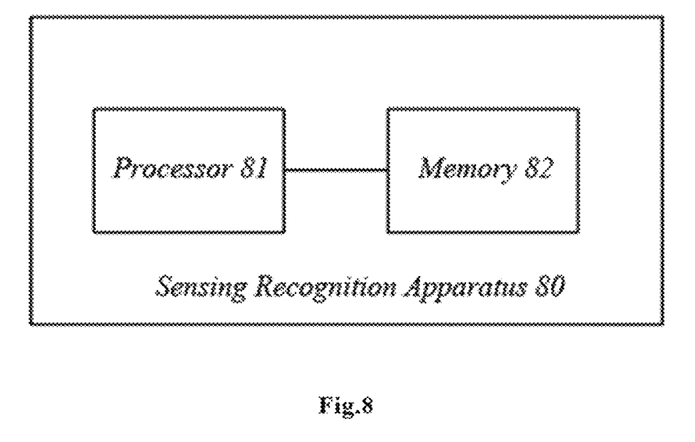
FIG. 8 is a schematic block diagram of a sensing recognition apparatus according to an embodiment of the present disclosure.

FIG. 8 is a schematic block diagram of a sensing recognition apparatus according to an embodiment of the present disclosure. Referring to FIG. 8, a sensing recognition apparatus 80 comprises a processor 81 and a memory 82. The processor 81 obtains channel state information from the received wireless communication signal, extracts a channel state feature value from the channel state information, and outputs a sensing result mapped with the channel state feature value according to the channel state feature value. The memory 82 stores the channel state information obtained by the processor 81.

Figure 9:
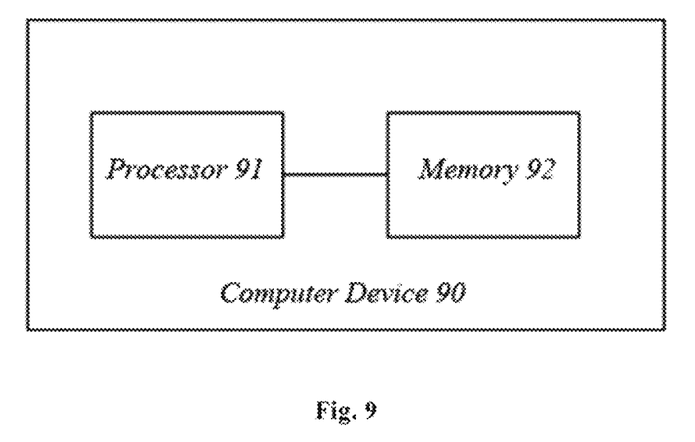
FIG. 9 is a schematic block diagram of a computer device according to an embodiment of the present disclosure.

FIG. 9 is a schematic block diagram of a computer device according to an embodiment of the present disclosure. Referring to FIG. 9, a computer device 90 comprises a processor 91 and a memory 92 having executable code stored thereon, when the executable code is executed by the processor 91, the processor 91 performs the steps of obtaining channel state information from the received wireless communication signal; extracting a channel state feature value from the channel state information; and outputting a sensing result mapped with the channel state feature value according to the channel state feature value.

Figure 10:
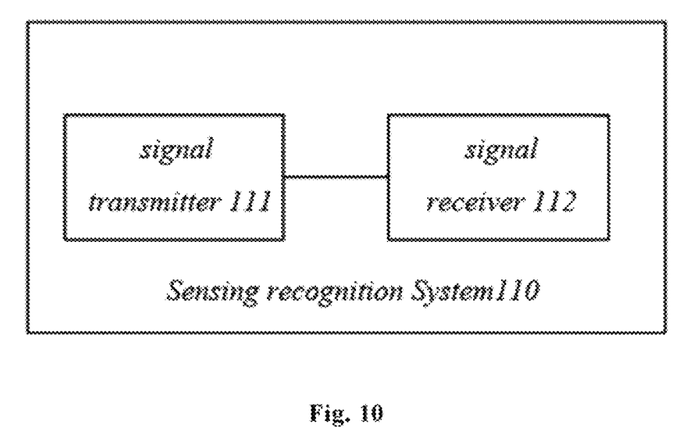
FIG. 10 is a schematic block diagram of a sensing recognition system based on wireless communication signals according to an embodiment of the present disclosure.

FIG. 10 is a schematic block diagram of a sensing recognition system based on wireless communication signals according to an embodiment of the present disclosure. Referring to FIG. 10, the sensing recognition system 110 comprises a signal transmitter 111 and a signal receiver 112.

The signal transmitter 111 transmits a wireless communication signal to the signal receiver 111. The signal receiver 112 obtains channel state information from the received wireless communication signal, extracts a channel state feature value from the channel state information, and outputs a sensing result mapped with the channel state feature value according to the channel state feature value.

The wireless router can be used as a signal transmitter to transmit WiFi signals, and the computer device having a wireless network card can serve as a signal receiver. The wireless router can be a commercial wireless router or an ordinary router.

An embodiment of the present disclosure further provides a non-transitory machine-readable storage medium having executable code stored thereon, when the executable code is executed by a processor of an electronic device, the processor executes the steps of obtaining channel state information from the received wireless communication signal; extracting a channel state feature value from the channel state information; and outputting a sensing result mapped with the channel state feature value according to the channel state feature value.

To sum up, in the embodiments of the present disclosure, the channel state information is selectively obtained from the received wireless communication signal, the channel state feature value is extracted from the channel state information, and the sensing result mapped with the channel state feature value is output according to the channel state feature value. The channel state information (CSI), as a physical parameter, can better reflect the motion features of human or object, in particular, it can reflect the motion of human or object occurring in the physical space between the transmitter and the receiver of the wireless communication signals, so that in the present disclosure, the channel state feature value extracted from the channel state information is used to output the corresponding mapped sensing result. When the channel state feature value is different, different sensing results are output, so that the motion of human or object can be sensed by sensing the change of the channel state feature value, which cannot only improve the accuracy of sensing recognition, but also can achieve better recognition results, and is more beneficial to human-computer interaction or intelligent recognition.

The technical solution according to the present disclosure has been described in detail with reference to the accompanying drawings.

Furthermore, the method according to the disclosure can also be implemented as a computer program or a computer program product comprising computer program code instructions for carrying out the above-mentioned steps as defined in the above method of the disclosure.

Alternatively, the present disclosure may also be embodied as a non-transitory machine-readable storage medium (or a computer-readable storage medium or a machine-readable storage medium) having executable code (or computer program, or computer instructions code) stored thereon, when the executable code is executed by a processor of an electronic device (or computing device, server, etc.), the processor performs various steps of the above-described method according to the disclosure.

Those of skill in the art will also appreciate that the various illustrative logical blocks, modules, circuits, and algorithm steps described in connection with the disclosure herein may be implemented as electronic hardware, computer software, or a combination of both.

It should be understood by those of ordinary skill in the art that the description is only the specific embodiments of the present disclosure and is not intended to limit the present disclosure. Any modifications, equivalent replacements, and improvements made within the spirit and principle of the present disclosure should be fallen into the scope of the present disclosure.

The invention claimed is:

1. A sensing recognition method based on wireless communication signals, comprising the steps of:
obtaining channel state information CSI from a received wireless communication signal;
performing a phase calibration on the phase of the CSI by a linear transformation method;
performing a filtering processing on amplitude and the phase of the CSI by a Hampel filter to find outliers within a window and replace the outliers with the mean, to filter out interferences of other human activities;
performing an amplitude-modulation processing on the amplitude of the CSI by a moving average filter;
extracting channel state feature values from the CSI; wherein, the channel state feature values comprise at least one amplitude feature value of the CSI and at least one phase feature value of the CSI; and
outputting a sensing result mapped with the channel state feature values according to the channel state feature values;
wherein performing a phase calibration on the phase of the CSI by a linear transformation method comprises:
obtaining a phase estimate of the $k^{th}$ sub-carrier according to the following equation, and taking the phase estimate of the $k^{th}$ sub-carrier as the phase of the CSI after the phase calibration:

$$PHe(k)=PHm(k)-PHsl\times SN(k)-PHin$$

wherein, PHe(k) represents the phase estimate of the $k^{th}$ sub-carrier; PHm(k) represents the measurement of the Phase of the $k^{th}$ sub-carrier; PHsl represents the phase slope of entire band; SN(k) represents the serial number of the $k^{th}$ sub-carrier; and PHin represents the Phase intercept of entire band.

2. The sensing recognition method according to claim 1, wherein the wireless communication signal includes a WAPI signal transmitted by a wireless router.

3. The sensing recognition method according to claim 1, wherein before the step of performing a phase calibration on the phase of the CSI by a linear transformation method, the method further comprises the step of:
  performing a noise-elimination processing on the CSI by a low-pass filter.

4. The sensing recognition method according to claim 1, wherein the step of outputting a sensing result mapped with the channel state feature values according to the channel state feature values comprises the steps of:
  inputting the channel state feature values into a preset classifier to obtain a classification label mapped with the channel state feature values; and
  outputting a sensing result according to the classification label.

5. The sensing recognition method according to claim 1, wherein obtaining CSI from a received wireless communication signal comprises:
  obtaining the CSI from each received data packet, wherein the CSI is expressed as:

$$H(k)=\|H(k)\|e^{1\angle H(k)}$$

wherein, H(k) represents the CSI of the $k^{th}$ OFDM sub-carrier, $\|H(k)\|$ represents the measurement of the amplitude of the CSI of the $k^{th}$ OFDM sub-carrier and $\angle H(k)$ represents the measurement of the phase of the CSI of the $k^{th}$ OFDM sub-carrier.

6. The sensing recognition method according to claim 1, wherein, the phase slope of entire band PHsl is obtained from:

$$PHsl = \frac{PHm(30) - PHm(1)}{SN(30) - SN(1)}$$

wherein, PHm(30) represents the measurement of the phase of the $30^{th}$ sub-carrier; PHm(1) represents the measurement of the phase of the $1^{st}$ sub-carrier, SN(30) represents the serial number of the $30^{th}$ sub-carrier; and SN(1) represents the serial number of the 1 sub-carrier; and
  the phase intercept of entire band PHin is obtained from:

$$PHin = \frac{\sum_k PHm(k)}{30}.$$

7. The sensing recognition method according to claim 1, wherein extracting channel state feature values from the CSI comprises: obtaining at least one of the following values: the mean, the variance, the standard deviation STD, the mean absolute deviation MAD, the signal period, the peak-to-peak value PTP, the correlation, the energy, the integration, the mean skewness, the interquartile range IR, and the max of the measurements of the amplitude of 30 sub-carriers in each data packet; and taking the value obtained as the at least one amplitude feature value of the CSI.

8. The sensing recognition method according to claim 1, wherein extracting channel state feature values from the CSI comprises: obtaining at least one of the following values: the Fast Fourier Transform FFT coefficients, the energy spectral density, and the entropy of the measurements of the amplitude of 30 sub-carriers in each data packet; and taking the value obtained as the at least one amplitude feature value of the CSI.

9. The sensing recognition method according to claim 1, wherein extracting channel state feature values from the CSI comprises: obtaining at least one amplitude feature value from the amplitude of the CSI by wavelet transforms.

10. The sensing recognition (method according to claim 1, wherein extracting channel state feature values from the CSI comprises: obtaining a difference between the phase estimated values of two receiving antennas of a same sub-carrier; and taking the differences of 30 sub-carriers in each data packet as the at least one phase feature value of the CSI.

11. The sensing recognition method according to claim 1, wherein the wireless communication signal includes a WiFi signal transmitted by a wireless router.

12. A sensing recognition device based on wireless communication signals, comprising: a processor and a memory storing executable code; wherein,
  the executable code is executed by the processor to:
  obtain channel state information CSI from a received wireless communication signal;
  perform a phase calibration on the phase of the CSI by a linear transformation method;
  perform a filtering processing on amplitude and the phase of the CSI by a Hampel filter to find outliers within a window and replace the outliers with the mean, to filter out interferences of other human activities;
  perform an amplitude-modulation processing on the amplitude of the SI by a moving average filter;
  extract channel state feature values from the CSI obtained by the information obtaining module; wherein the channel state feature values comprise at least one amplitude feature value of the CSI and at least one phase feature value of the CSI; and
  output a sensing result mapped with the channel state feature values according to the channel state feature values extracted by the feature extracting module;
  wherein performing a phase calibration on the phase of the CSI by a linear transformation method comprises:
  obtaining a phase estimate of the $k^{th}$ sub-carrier according to the following equation, and taking the phase estimate of the $k^{th}$ sub-carrier as the phase of the CSI after the phase calibration:

$$PHe(k)=PHm(k)-PHsl \times SN(k)-PHin$$

wherein, PHe(k) represents the phase estimate of the $k^{th}$ sub-carrier; PHm(k) represents the measurement of the phase of the $k^{th}$ sub-carrier; PHsl represents the phase slope of entire band; SN(k) represents the serial number of the $k^{th}$ sub-carrier; and PHin represents the phase intercept of entire band.

13. The sensing recognition device according to claim 12, wherein the executable code is executed by the processor further to:
  perform a signal pre-processing on the amplitude and the phase of the CSI obtained by the information obtaining module; and
  extract the channel state feature values from the CSI performed by the signal preprocessing.

14. The sensing recognition device according to claim 12, wherein the executable code is executed by the processor further to:
  input the extracted channel state feature values into a preset classifier to obtain a classification label mapped with the channel state feature values; and output a sensing result according to the classification label obtained by the classification sub-module.

15. A non-transitory machine-readable storage medium, wherein, the storage medium stores executable code, wherein, the executable code is executed by a processor to:
obtain channel state information CSI from a received wireless communication signal;
perform a chase calibration on the phase of the CSI by a linear transformation method;
perform a filtering processing on amplitude and the phase of the CSI by a Hampel fitter to find outliers within a window and replace the outliers with the mean, to filter out interferences of other human activities;
perform an amplitude-modulation processing on the amplitude of the CSI by a moving average filter;
extract channel state feature values from the CSI obtained by the information obtaining module; wherein the channel state feature values comprise at least one amplitude feature value of the CSI and at least one phase feature value of the CSI; and
output a sensing result mapped with the channel state feature values according to the channel state feature values extracted by the feature extracting module;
wherein performing a phase calibration on the phase of the CSI by a linear transformation method comprises:
obtaining a phase estimate of the $k^{th}$ sub-carrier according to the following equation, and taking the phase estimate of the $k^{th}$ sub-carrier as the phase of the CSI after the phase calibration:

$$PHe(k)=PHm(k)-PHsl \times SN(k)-PHin$$

wherein, PHe(k) represents the phase estimate of the $k^{th}$ sub-carrier; PHm(k) represents the measurement of the phase of the $k^{th}$ sub-carrier; PHsl represents the phase slope of entire band; SN(k) represents the serial number of the $k^{th}$ sub-carrier; and PHin represents the phase intercept of entire band.

\* \* \* \* \*